May 26, 1953     H. G. MOJONNIER     2,639,591
LIQUID COOLING APPARATUS
Filed April 29, 1948     2 Sheets-Sheet 1

INVENTOR.
Harry G. Mojonnier
BY
Moore, Olson & Trexler
Attys.

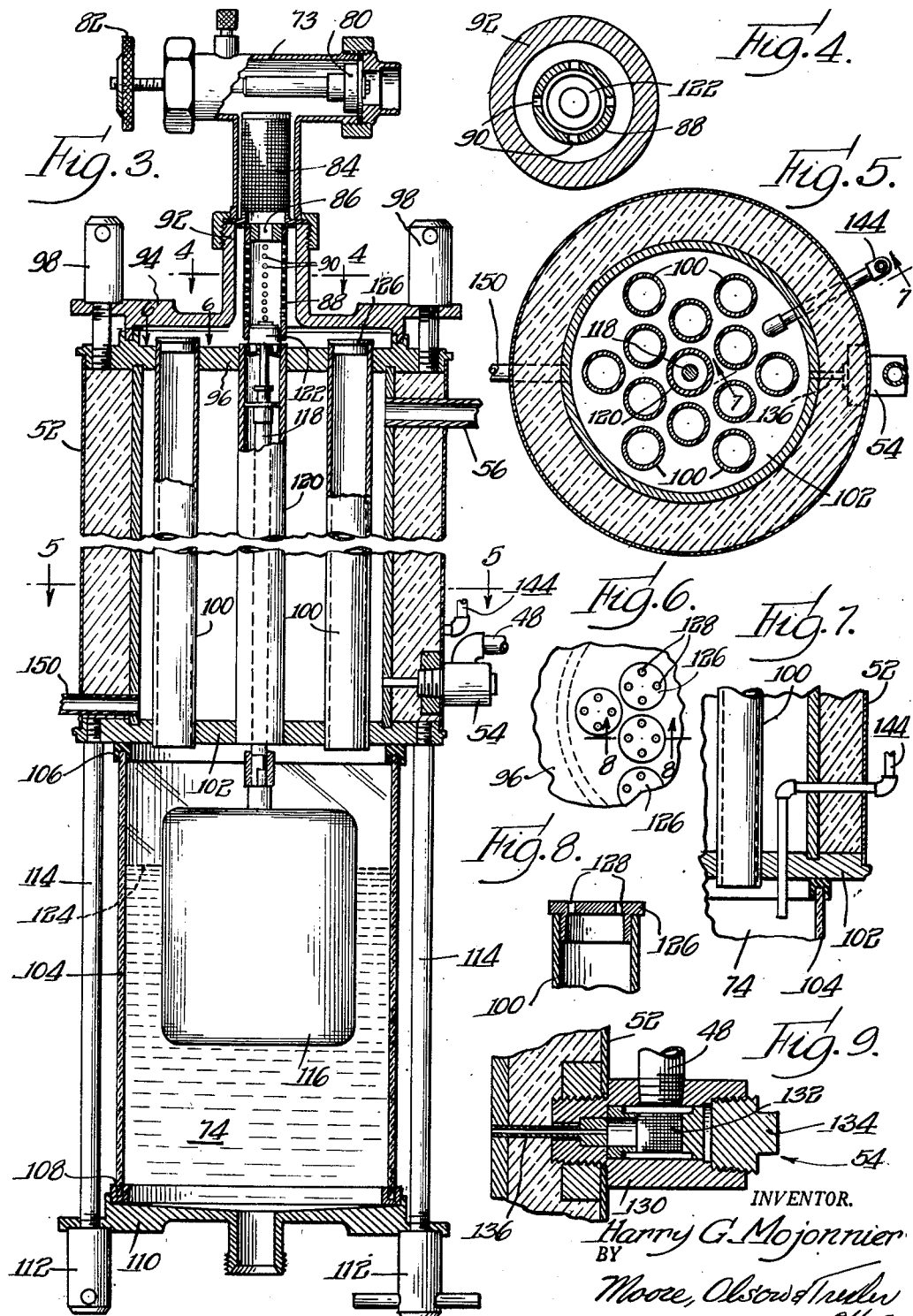

Patented May 26, 1953

2,639,591

UNITED STATES PATENT OFFICE 2,639,591

LIQUID COOLING APPARATUS

Harry G. Mojonnier, Oak Park, Ill., assignor to Mojonnier Bros. Co., Chicago, Ill., a corporation of Illinois Application April 29, 1948, Serial No. 24,012

12 Claims. (Cl. 62—3)

This invention relates to heat exchange apparatus, and concerns particularly apparatus for cooling syrup and the like in conjunction with bottling operations.

In the bottling of carbonated beverages, it is desirable to cool the carbonated water in connection with the carbonation thereof, so as to increase the absorption of the carbon dioxide gas into the water, and reduce the required carbonating pressures in reference to the degree of carbonation required.

In conventional filling apparatus, it is customary to first insert a desired quantity of flavoring syrup into each bottle to be filled, and then add the carbonated water, and effect a mixing with the syrup, to produce the desired quantity of beverage within the bottle. In instances wherein the carbonated water has been precooled, which is desirable for the reasons above discussed, as the cooled water strikes the warmer flavoring syrup, a boiling or foaming takes place which slows down the filling operation, and frequently results in non-uniform filling of the bottles to be charged. Also, the foaming results in loss of carbon dioxide gas, which in turn requires a higher degree of precedent carbonation, entailing higher carbonating pressures, higher equipment costs, and like factors.

In accordance with the present invention means and methods are provided for effecting a precooling of the syrup, prior to its contact with the carbonated water and in connection with the bottling operations, and specifically such cooling is effected, in accordance with one preferred embodiment of the invention, so as to correlate the degree of cooling imparted to the syrup in respect to the cooling imparted to the carbonated water, so as to minimize foaming and facilitates the bottle filling operations.

It is an object of the present invention to provide a cooling apparatus, specifically for flavoring syrup, and the like, of improved construction and improved operating characteristics.

A further object of the invention is to provide, in connection with bottling operations of the type set forth, improved means and methods for effecting a correlated cooling of flavoring syrup, in reference to the carbonated water or other ingredients with which the syrup is to be mixed in connection with the filling operations; whereby to facilitate and improve the filling more particularly in reference to the speed, accuracy and ease with which the filling operations may be effected.

A still further object of the invention is to provide an improved cooling apparatus, specifically for flavoring syrup as hereinbefore set forth, but also of general application, wherein an improved metering of the fluid to be cooled through the apparatus is effected, wherein an improved controlled fluid flow through the apparatus results, and wherein the parts are arranged in an improved manner to facilitate sanitation and cleaning.

Still another improvement provided by the present invention is the use of a pressure gas, preferably the same gas with which the other liquid components of the system are to be charged, for effecting the ejection of the cooled liquid medium from the cooling apparatus.

Various other objects, advantages, and features of the invention will be apparent from the following specification when taken in connection with the accompanying drawings wherein certain preferred embodiments are set forth for purposes of illustration.

In the drawings, wherein like reference numerals refer to like parts throughout:

Fig. 3 is an enlarged longitudinal sectional view of the syrup cooling apparatus or unit, forming a part of the assemblies of Figs. 1 and 2;

Fig. 4 is a further enlarged sectional view of the structure of Fig. 3 on the line 4—4 thereof;

Fig. 5 is a sectional view of the structure of Fig. 3 taken as indicated by the line 5—5;

Fig. 6 is a partial detail view, more particularly illustrating the liquid distributing caps for the tubes, and taken as indicated by the line 6—6 of Fig. 3;

Fig. 7 is a partial sectional view of the structure, on the line 7—7 of Fig. 5;

Fig. 8 is an enlarged detail view of one of the distributing caps, and its associated pipe or conduit, taken as indicated by the line 8—8 of Fig. 6; and Fig. 9 is an enlarged sectional view of an orifice device, forming a part of the structure.

Figure 1:
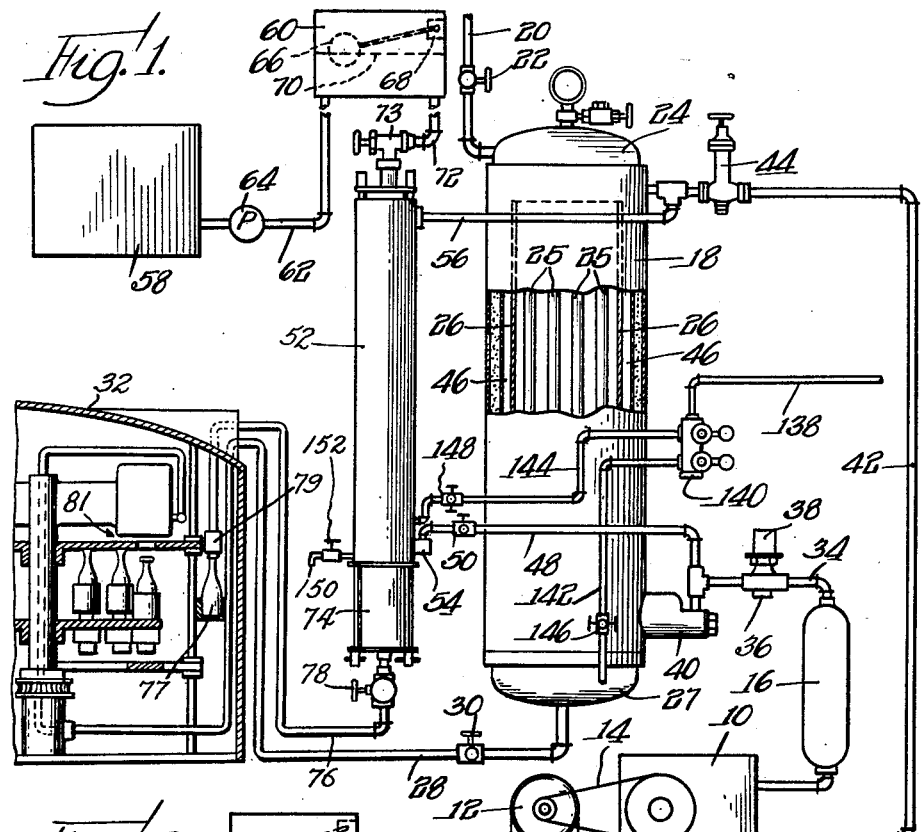
Fig. 1 is a general assembly view of a refrigeration system including cooling apparatus constructed in accordance with and embodying the principles of the present invention.

In the drawings, the invention has been illustrated as incorporated into a refrigeration system for cooling the syrup and other components in connection with bottle or container filling operations, a use to which the invention is particularly adapted and has special application. It is to be understood, however, that the various features of the invention, including the structural aspects of the cooling unit hereinafter to be particularly described, may be employed in various types of installations, and for various uses, wherein such features have applicability and may be desired.

Referring more particularly to the drawings, and first to the structural embodiment illustrated in Fig. 1, the system shown comprises a compressor 10, for refrigerant, driven from a motor 12 through suitable drive connections 14. The refrigerant is transmitted from the compressor to a condenser 16 and thence to an evaporator structure, or cooling unit, as indicated by the reference numeral 18.

This cooling unit is preferably of the type fully set forth and described in the copending application of Harry G. Mojonnier and Bernard G. McGovern, Serial No. 671,650, filed May 22, 1946, now issued as Patent No. 2,519,845, dated August 22, 1950. The cooling unit 18 comprises an inlet 20 for the liquid to be cooled, which is water in the installation of Fig. 1. Passage of the water through the inlet 20 is controlled by means of a valve 22, the water passing into an upper header dome 24 within which it is distributed and caused to pass downwardly through a series of parallel cooling tubes 25 mounted within a shell or casing 26, to be collected in a lower header dome 27, as more particularly described in said Mojonnier and McGovern application. From the lower header the cooled water passes through an outlet conduit 28, under control of a valve 30, to a bottle filling apparatus 32 which may be of any suitable type, for example of the type more particularly illustrated in the copending application of Harry G. Mojonnier, Serial No. 577,959, filed February 15, 1945. Within the filling apparatus bottles may be filled in rapid sequence, the bottles being first charged with flavoring syrup to a predetermined amount, and then further filled with carbonated water, in the instance of carbonated beverages, as will more particularly hereinafter appear.

The refrigerant passes from the condenser 16 to the evaporator or cooling unit 18 through a conduit 34 under control of a solenoid actuated valve 36, the controlling solenoid 38 of which may be arranged for control by the bottle filling machine 32 so that the valve 36 is open to circulate refrigerant only during such time that the filling machine 32 is in operation. The refrigerant is introduced into the evaporator 18 by means of an injector 40, the refrigerant passing upwardly through the shell 26 along the outer surfaces of tubes 25, the refrigerant returning to the compressor by means of a return conduit 42 under control of a back pressure valve 44 which thus determines the refrigerant temperature of the system. As further more particularly pointed out in said copending Mojonnier and McGovern application, the shell 26 is of limited height so that some of the refrigerant returns to the injector through the spaces 46 along the outer wall of the shell 26, thus forming a surge drum for the refrigerant, as well as an evaporator and a cooling unit for the water to be cooled. In normal operation, for example, the tank structure 18 may be controlled by the back pressure valve 44 so as to be maintained approximately half filled with refrigerant in the liquid state, and half filled with refrigerant in the gaseous state.

A branch conduit 48 controlled by a shut off valve 50 leads to an evaporator and cooling unit 52, the cooperative arrangement of which and the detailed structure of which forms a part of the present invention. In normal operation the valve 50 may be fully opened and the rate of refrigerant delivery to the cooling unit 52 controlled by a metering orifice structure 54, having a metering orifice of predetermined fixed size, as will presently be described. The refrigerant passes upwardly through the tank structure 52 and is exhausted through a conduit 56 connecting with the return line 42 on the forward side of the back pressure valve 44 so that in effect the conduit 56 is in communication with the upper end of the evaporator or tank structure 18.

The liquid to be cooled within the cooling unit 52, flavoring syrup in the embodiment shown, passes from a storage tank 58 which may be disposed at any suitable location, to an auxiliary tank 60 through a conduit 62 under propulsion by a syrup pump 64 of suitable sanitary type. The auxiliary tank 60 is provided with a float 66 and float switch 68 for controlling the action of the pump 64, so that the syrup will be maintained at a predetermined level 70 within the auxiliary tank structure at all times. From the auxiliary tank the syrup flows by gravity through a conduit 72 provided with a valve 73, and passes downwardly through the tank to a reservoir 74, being cooled in the process as will presently be described. From the reservoir 74 the cooled syrup passes through a conduit 76, provided with a shut off valve 78, to the filling machine. Normally the valves 73 and 78 are fully open, the rate of syrup flow through the cooling unit 52 being controlled by automatic flow metering mechanism provided therein, as hereinafter described. Within the filling machine the syrup is introduced, in predetermined quantity, into the bottles or other containers 77 as they pass along the inlet conveyor, by means of an automatic filling valve mechanism 79, of a desired suitable type. The bottles or containers then pass to the carbonated water filling station 81, where the carbonated water is introduced under pressure, to complete the filling operation.

The structure of the cooling unit 52 is illustrated in detail in Figs. 3–9. It will be seen that the valve structure 73 more specifically comprises a valve member 80 arranged for control by a handle 82 so that upon closure of the valve syrup flow to the tank structure may be shut off. With the valve open, the syrup flows from the valve casing inwardly through the walls of a cylindrical strainer 84 and thence passes through the central bore 86 of a cap member which lies upon the upper end of a perforated metering tube 88. As best shown in Figs. 3 and 4, this metering tube is provided with a series of radially disposed openings 90 through which the syrup may flow outwardly into the upstanding neck portion 92 of a cap member 94 clamped to a head plate 96 by means of a series of hand nuts 98.

A series of pipes or tubes 100 have their upper ends extending through the upper head plate 96, and their lower ends similarly extending through a lower head plate 102 so that the syrup may flow by gravity from the cap neck 92 through the tubes into the reservoir 74, previously described. This reservoir is formed by a cylindrical casing 104, preferably of glass, the upper end of which is anchored to a gasket 106 secured to the head plate 102, and the lower end of which is similarly anchored to a gasket 108 fixed to a base plate 110. A series of hand nuts 112, similar to the nuts 98, are threadedly connected to longitudinally extending rods or bolts 114 so that by tightening the nuts the glass casing 104 may be clamped between the gaskets 106 and 108 with the desired pressure to provide a fluid-tight connection. It will be seen, however, that by removing the nuts 112 the casing 104 may be readily removed, for inspection, cleaning, and repair, and at the same time the internal surfaces of the tubes 100 along which the syrup passes are rendered accessible for similar purposes. In a similar manner by removal of the nuts 98 the upper ends of the tubes, and the associated parts, are rendered accessible for cleaning, sanitation, and the like.

To control the rate of syrup flow into the reservoir 74, the reservoir is provided with a float 116, preferably of stainless steel, said float being secured to an operating rod 118 extending upwardly through an elongated tubular casing 120. The upper end of rod 118 is provided with a valve head 122 which is axially shiftable within the metering tube 88; the arrangement being such that as the float 116 is raised the valve head 122 progressively cuts off the flow openings 90 formed through the wall of the metering tube. By reason of this structure it will be seen that the float automatically controls the syrup flow through the cooling unit and maintains the syrup at a desired level 124 within the reservoir 74, notwithstanding that the valves 73 and 78 are fully open. The rate of flow through the cooling unit is thus automatically controlled in accordance with the requirements of the filling machine 32 to which the syrup is delivered from the cooling unit reservoir.

The syrup is caused to flow along the internal walls of the pipes 100, in a thin film to facilitate cooling, by means of cap members 126, one for each tube, shown in detail in Figs. 6 and 8. It will be seen that each cap member is provided with a series of openings of desired size 128 around its outer margin so that the syrup is caused to flow through these openings and then along the tube walls in a thin film for maximum cooling effects. The caps 126 may be removed from the tubes, for cleaning purposes by removal of the bolted cap member 94.

The orifice device 54 for controlling the rate of refrigerant flow into the syrup cooling unit is illustrated in Figs. 3 and 9. This device comprises a housing 130 screw threaded to the cooler casing 52, said housing being provided with a strainer 132, a sealing and cleaning block 134, and an orifice tube 136 of predetermined fixed size extending into the cooling unit 52. The orifice tube 136 is of a size to bleed a desired quantity of refrigerant into the cooling unit 52 from the cooler 18, in accordance with the capacity requirements of the system.

Within the cooling unit 52, the refrigerant passes upwardly along the outer surfaces of tubes 100, to be exhausted through conduit 56, thereby cooling the downflowing syrup film within the cooling tubes.

In accordance with the present invention carbonating gas under pressure, which may be carbon dioxide in the embodiment shown, is employed for the dual purpose of carbonating the water within the cooler 18, and also pressure ejecting the syrup from the syrup cooler as well as from the water cooler, to the filling machine 32. More particularly, referring to Fig. 1, it will be seen that a conduit 138, connected to a suitable source of carbon dioxide gas supply leads to a pressure reducing control valve 140, one outlet of which leads through a conduit 142 to the lower header dome 27 of the water cooler 18, whereas the other outlet leads through a conduit 144 to the syrup cooler 52. A combined shut off and vent valve 146 is disposed in conduit 142, and a similar combined shut off and vent valve 148 is disposed in conduit 144, the arrangement of each of these valves being such that gas flow through the associated pipe line may be cut off, and the coolers also selectively vented to atmosphere, if desired. The pressure reducer 140 is so arranged that gas pressure is transmitted to the conduit 142, at a suitable carbonating pressure, whereas the gas is transmitted to conduit 144 at a materially lower pressure, on the order of a gauge pressure of five pounds, for the purposes desired. As more particularly pointed out in said Mojonnier and McGovern application, the carbonating gas delivered to the header 27 contacts the water being cooled within the cooling pipes 25, and within the headers 27 and 24, whereby to effect a carbonating of the water simultaneously with the cooling thereof in the cooler 18.

As best shown in Figs. 3, 5 and 7, the conduit 144, associated with the syrup cooler 52, extends through the side wall thereof and then downwardly through the head plate 102 for communication with the reservoir 74, and with the syrup body therein.

A drain conduit 150, Figs. 1, 3 and 5, controlled by a valve 152, communicates with the refrigerant space within the cooler 52 for the drainage of sediment, oil, and other foreign matter, as may be required.

In the operation of the structure it will be seen that the water and syrup are both cooled from a common refrigerating system, under control of the common back pressure valve 44 determining the refrigerant temperature, whereby the temperature of the syrup and water as they are transmitted to the filling machine 32 will be properly correlated. This dual cooling of the water and syrup minimizes foaming within the bottles being filled, thereby permitting a faster filling operation, insuring a uniform filling, and minimizing the loss of the carbon dioxide gas from the water. This in turn permits the use of lower carbonating pressure within the cooler 18, and increases the efficiency of the operation.

The flow of syrup through the cooler 52 is automatically metered in accordance with the requirements of the filling machine. The carbon dioxide gas not only effects the water carbonation, in conjunction with the cooling, in the cooler 18; but also provides pressure for ejecting both the syrup and the water to the filling machine 32, at a desired pressure. As will be understood, the head provided by the auxiliary reservoir 60 overcomes the relatively low gas pressure within the cooler 52, to insure proper circulation of the syrup, and suitable pressure means may be applied to the inlet conduit 20 to the water cooler, as required.

Figure 2:
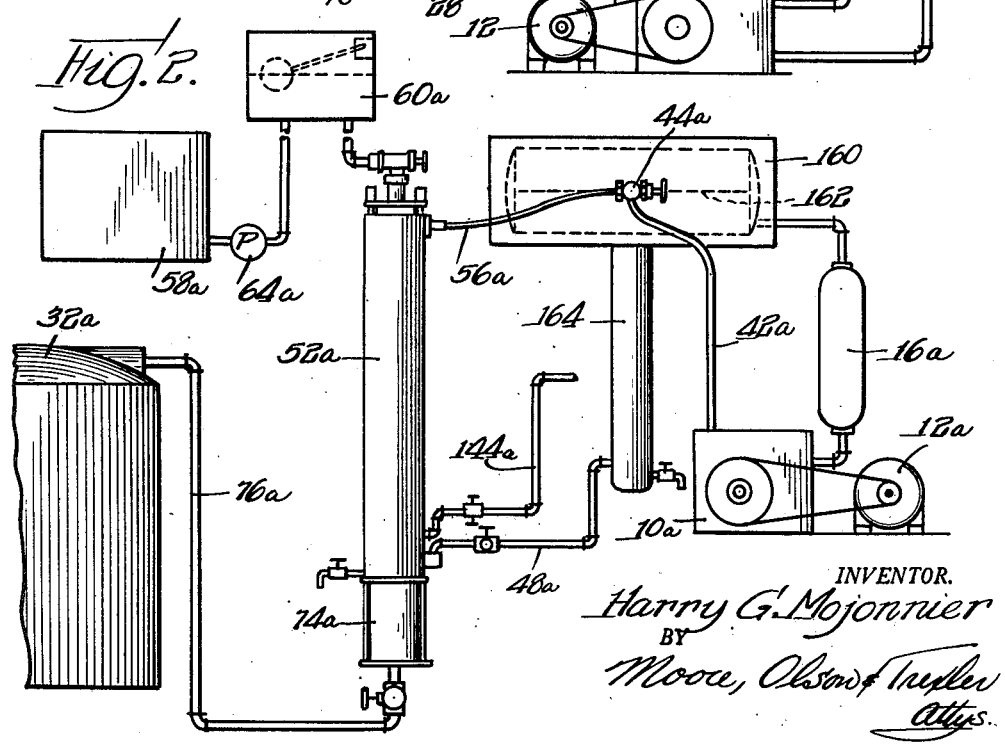
Fig. 2 is a view generally similar to Fig. 1, but illustrating a modified embodiment of the invention.

In Fig. 2 an embodiment is illustrated substantially similar to the structure above described, but wherein the syrup cooler 52a, functionally similar to the cooler 52 previously described, is provided with its own refrigerant system, disassociated from the water cooler and carbonator as in the structure of Fig. 1. More particularly, in this instance the refrigerant system comprises a compressor 10a, condenser 16a, and a surge drum 160 within which the refrigerant is maintained at a predetermined level as indicated at 162. A depending leg 164 of the surge drum is connected to the cooler 52a by means of a conduit 48a functionally similar to the conduit 48 previously described. The refrigerant return conduit 56a leads back to the surge drum and to a back pressure control valve 44a connecting to a return line 42a to the compressor. Carbon dioxide gas, or other gas, is introduced into the cooler 52a by means of a supply line 144a, as in the embodiment previously described. It is believed that the operation of the structure of Fig. 2 will be clear, the parts otherwise being the same as previously described in reference to Fig. 1.

It is obvious that various changes may be made in the specific embodiments shown and described without departing from the spirit of the invention. The invention is accordingly not to be limited to the particular embodiments shown but only as indicated in the following claims.

The invention is hereby claimed as follows:

1. A refrigerating apparatus comprising a first evaporator unit, means for circulating water to be cooled therethrough, a second evaporator unit, means for circulating syrup to be cooled therethrough, and a common refrigerant system effecting the cooling of both evaporator units, said refrigerant system including means for proportioning the delivery of refrigerant to said evaporator units, and a common back pressure valve for controlling the refrigerant temperature within said evaporator units.

2. A refrigerating apparatus comprising a first cooling unit, means for circulating water to be cooled therethrough, a second cooling unit, means for circulating syrup to be cooled therethrough, a common refrigerant system effecting the cooling of both units, means for effecting the delivery of syrup to said second cooling unit, and means to control said delivery means in accordance with the rate of delivery of the syrup from said unit.

3. A refrigerating apparatus comprising a first cooling unit, means for circulating water to be cooled therethrough, a second cooling unit, means for circulating syrup to be cooled therethrough, a common refrigerant system effecting the cooling of both units, a bottle filling machine, means interconnecting the bottling machine with both said units, and means controlled by the operation of said filling machine for controlling the delivery of syrup to said second cooling unit.

4. A refrigerating apparatus comprising a first cooling unit, means for circulating water to be cooled therethrough, a second cooling unit, means for circulating syrup to be cooled therethrough, and a common refrigerant system effecting the cooling of both units, said refrigerant system including an injector for the first cooling unit, a metering orifice for the second cooling unit, and a common back pressure valve for controlling the refrigerant temperature in both said units.

5. A refrigerating apparatus comprising a first evaporator unit having a plurality of parallel conduits forming cooling passages, means for circulating water to be cooled through said conduits, a second evaporator unit having a plurality of parallel conduits forming cooling passages, means for circulating syrup to be cooled through the conduits of said second evaporator unit, a common refrigerant system effecting the cooling of both units, said refrigerant system including means for proportioning the supply of refrigerant to said units, and a common back pressure valve for controlling the temperature of the refrigerant therein.

6. A cooling unit comprising a conduit for a liquid to be cooled, a conduit for refrigerant, said conduits being in juxtaposition to facilitate heat transfer therebetween, a reservoir for the cooled liquid, a float in said reservoir, a metering tube having a plurality of passages therein, and a valve member operated by the float, said valve member being effective to close certain of said passages at different levels of liquid in said reservoir whereby to control the flow of said liquid through the unit.

7. A cooling unit comprising a tank, a plurality of conduits extending longitudinally therein forming parallel passageways for a liquid to be cooled, a conduit for refrigerant extending longitudinally of the tank, said conduits being in juxtaposition to facilitate heat transfer between the refrigerant and the liquid to be cooled, a reservoir for the cooled liquid communicating with said plurality of conduits and receiving the cooled liquid therefrom, and means controlled by the liquid level within said reservoir for controlling the passage of said liquid through said parallel conduits.

8. A beverage bottling apparatus comprising a first cooling unit, means for circulating water to be cooled therethrough, means for carbonating said water, a second cooling unit, means for circulating syrup to be cooled therethrough, a common refrigerant system effecting the cooling of both units to cool the carbonated water and the syrup to substantially the same temperature, a bottle filling machine, and means interconnecting said bottle filling machine with both of said units, said interconnecting means serving to deliver the cooled carbonated water and the cooled syrup to a bottle positioned in said bottle filling machine and to mix said water and said syrup in said bottle.

9. In a bottling apparatus including a bottle filling machine, a first cooling unit, means for circulating water to be cooled therethrough, means for carbonating said water, a second cooling unit, means for circulating syrup to be cooled therethrough, a common refrigerant system effecting the cooling of both units to cool the carbonated water and the syrup to substantially the same temperature, and means interconnecting the bottle filling machine with both of said units, said interconnecting means serving to deliver the cooled carbonated water and the cooled syrup to a bottle positioned in said bottle filling machine and to mix said water and said syrup in said bottle.

10. A cooling unit comprising a conduit for a liquid to be cooled, a conduit for refrigerant, said conduits being in juxtaposition to facilitate heat transfer therebetween, a reservoir for the cooled liquid, a float in said reservoir, metering valve means for controlling the flow of said liquid through the unit, and means interconnecting said float and said valve means so that said valve means progressively and continuously varies the rate of flow of said liquid through the unit in accordance with the position of said float.

11. In a cooling unit having a reservoir and an inlet conduit communicating with said reservoir, a metering tube having a plurality of apertures in the walls thereof, one end of said tube being connected to the inlet conduit and the other end being in communication with said reservoir, a valve closure positioned in said other end and constructed to move along said tube thereby closing certain of said apertures, a float in said reservoir, and link means interconnecting said float and said valve closure to control the position of said valve closure in accordance with the level of liquid in said reservoir whereby to control the flow of liquid through the unit.

12. A refrigerating apparatus comprising a first cooling unit, means for circulating water to be cooled therethrough, a second cooling unit, means for circulating syrup to be cooled therethrough, and a common refrigerant system effecting the cooling of both cooling units, said refrigerant system including means for proportioning the delivery of refrigerant to said cooling units, and a common back pressure valve for controlling the refrigerant temperature within said cooling units.

HARRY G. MOJONNIER.

References Cited in the file of this patent

UNITED STATES PATENTS

| Number | Name | Date |
|---|---|---|
| 2,107,053 | Coons | Feb. 1, 1938 |
| 2,267,568 | Kleucker | Dec. 23, 1941 |
| 2,389,106 | Marshall | Nov. 13, 1945 |
| 2,405,448 | Ritter | Aug. 6, 1946 |